United States Patent
Peng et al.

(10) Patent No.: US 10,683,416 B1
(45) Date of Patent: Jun. 16, 2020

(54) FLEXIBLE, UV-RESISTANT POLY(PHENYLENE ETHER) COMPOSITION AND INSULATED CONDUCTOR AND JACKETED CABLE COMPRISING THE COMPOSITION

(71) Applicant: SABIC GLOBAL TECHNOLOGIES B.V., Bergen op Zoom (NL)

(72) Inventors: Hui Peng, Shanghai (CN); Haiyang Gan, Shanghai (CN); Ying Na, Shanghai (CN); Shen Zhang, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/637,395

(22) PCT Filed: Sep. 5, 2018

(86) PCT No.: PCT/IB2018/056777
§ 371 (c)(1),
(2) Date: Feb. 7, 2020

(87) PCT Pub. No.: WO2019/053562
PCT Pub. Date: Mar. 21, 2019

Related U.S. Application Data

(60) Provisional application No. 62/557,262, filed on Sep. 12, 2017.

(51) Int. Cl.
| | | |
|---|---|---|
| *C08L 71/12* | (2006.01) | |
| *C08L 23/06* | (2006.01) | |
| *C08L 23/12* | (2006.01) | |
| *C08L 23/26* | (2006.01) | |
| *C08L 53/02* | (2006.01) | |
| *C08L 71/02* | (2006.01) | |
| *C08K 3/013* | (2018.01) | |
| *C08K 3/016* | (2018.01) | |
| *C08K 3/22* | (2006.01) | |
| *C08K 5/00* | (2006.01) | |
| *C08K 5/3492* | (2006.01) | |
| *C08K 5/315* | (2006.01) | |
| *C08L 23/08* | (2006.01) | |

(52) U.S. Cl.
CPC .............. *C08L 71/12* (2013.01); *C08K 3/013* (2018.01); *C08K 3/016* (2018.01); *C08K 3/22* (2013.01); *C08K 5/005* (2013.01); *C08K 5/315* (2013.01); *C08K 5/3492* (2013.01); *C08L 23/06* (2013.01); *C08L 23/0815* (2013.01); *C08L 23/12* (2013.01); *C08L 23/26* (2013.01); *C08L 53/02* (2013.01); *C08L 71/02* (2013.01); *C08K 2003/2224* (2013.01); *C08K 2003/2227* (2013.01); *C08L 2201/02* (2013.01); *C08L 2201/08* (2013.01); *C08L 2203/202* (2013.01); *C08L 2203/206* (2013.01); *C08L 2205/035* (2013.01)

(58) Field of Classification Search
USPC ......................................................... 525/391
See application file for complete search history.

(56) References Cited

U.S. PATENT DOCUMENTS

| | | |
|---|---|---|
| 3,375,297 A | 3/1968 | Barth et al. |
| 3,631,126 A | 12/1971 | Snodgrass et al. |
| 4,224,209 A | 9/1980 | Cooper et al. |
| 4,683,255 A | 7/1987 | Sugio et al. |
| 6,015,510 A | 1/2000 | Jacobson et al. |
| 6,025,419 A | 2/2000 | Kasowski et al. |
| 7,018,570 B2 | 3/2006 | Haruna et al. |
| 7,125,920 B2 | 10/2006 | Negishi et al. |
| 7,157,586 B2 | 1/2007 | Wood et al. |
| 7,622,522 B2 | 11/2009 | Qiu et al. |
| 8,017,697 B2 | 9/2011 | Carrillo et al. |
| 8,669,332 B2 | 3/2014 | Carrillo et al. |
| 9,074,086 B1 | 7/2015 | Levasalmi et al. |
| 9,175,160 B2 | 11/2015 | Peters |
| 2006/0131052 A1 | 6/2006 | Mhetar et al. |
| 2009/0133896 A1 | 5/2009 | Kosaka et al. |
| 2013/0253105 A1 | 9/2013 | Shan |
| 2013/0261237 A1 | 10/2013 | Qui et al. |
| 2014/0007325 A1 | 1/2014 | Davis |
| 2015/0056450 A1 | 2/2015 | Shan |
| 2015/0252214 A1 | 9/2015 | Shan |

(Continued)

FOREIGN PATENT DOCUMENTS

| | | |
|---|---|---|
| WO | 2008060738 A1 | 5/2008 |
| WO | 2013120306 A1 | 8/2013 |
| WO | 2013121363 A2 | 8/2013 |

(Continued)

OTHER PUBLICATIONS

International Search Report for International Application No. PCT/IB2017/050612; International Filing Date: Feb. 3, 2017; dated Apr. 21, 2017; 6 pages.

(Continued)

*Primary Examiner* — Terressa Boykin

(74) *Attorney, Agent, or Firm* — Cantor Colburn LLP

(57) ABSTRACT

A poly(phenylene ether) composition includes specific amounts of a poly(phenylene ether), a hydrogenated block copolymer of an alkenyl aromatic monomer and a conjugated diene, a polypropylene or a polyethylene, a low molecular weight polybutene, a flame retardant, a liquid ultraviolet absorbing agent, and a poly (alkylene oxide). The composition can be useful as an insulation or jacketing material for wires and cables, where the insulation and jacketing materials including the composition can have reduced surface blooming.

20 Claims, 1 Drawing Sheet

(56) References Cited

U.S. PATENT DOCUMENTS

2019/0071567 A1    3/2019  Peng et al.

FOREIGN PATENT DOCUMENTS

| WO | 2014026925 A1 | 2/2014 |
| WO | 2014039066 A1 | 3/2014 |

OTHER PUBLICATIONS

International Search Report for the corresponding PCT/IB2018/056777, International Filing Date: Sep. 5, 2018; dated Jan. 31, 2019; 5 pages.
Plastics Additive Handbook, 5th Edition, Cincinnati: Hanser Gardner Publications, Inc.; 2001; pp. 206-238.
Written Opinion for the corresponding PCT/IB2018/056777, International Filing Date: Sep. 5, 2018; dated Jan. 31, 2019; 7 pages.
Written Opinion of the International Searching Authority for International Application No. PCT/IB2017/050612; International Filing Date: Feb. 3, 2017; dated Apr. 21, 2017; 7 pages.

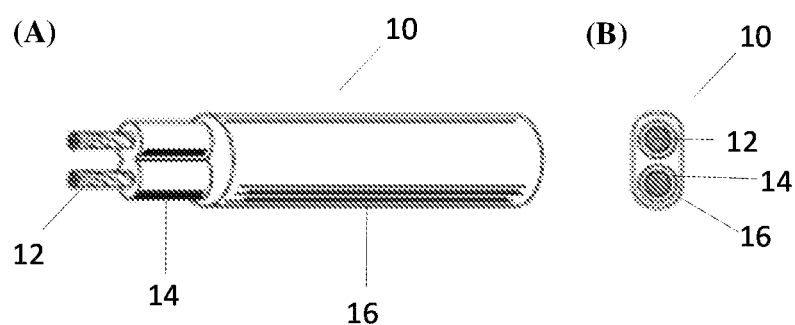

FLEXIBLE, UV-RESISTANT POLY(PHENYLENE ETHER) COMPOSITION AND INSULATED CONDUCTOR AND JACKETED CABLE COMPRISING THE COMPOSITION

CROSS-REFERENCE TO RELATED APPLICATIONS

This application is a National Stage application of PCT/IB2018/056777, filed Sep. 5, 2018, which claims benefit of U.S. Provisional Application No. 62/557,262 filed on Sep. 12, 2017, both of which are incorporated by reference herein in their entirety.

BACKGROUND

In the consumer electronics market, insulated conductors and jacketed cables are widely used to charge devices, and to transfer data to and from devices. Devices are often sold in a variety of colors, with matching colored insulated conductors and/or jacketed cables. Insulation and jacketing compositions containing poly(phenylene ether)s are known to exhibit many desirable properties, including flexibility, heat resistance, flame retardancy, and colorability. However, light-colored versions of these compositions can exhibit undesirable color changes (e.g., yellowing) on exposure to ultraviolet radiation. And while the incorporation of ultraviolet absorbers to such compositions can reduce unwanted color changes, relatively high concentrations of the ultraviolet absorbers can be required and be accompanied by unwanted migration of the ultraviolet absorber to the surface of an insulated conductor or jacketed cable (i.e., "surface blooming"). There remains a need for light-colored poly(phenylene ether)-containing compositions that exhibit good stability to ultraviolet radiation as well as reduced surface blooming.

BRIEF DESCRIPTION

A poly(phenylene ether) composition comprises 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

An insulated conductor comprises a conductor; and an insulating covering disposed over the conductor; wherein the insulating covering comprises a poly(phenylene ether) composition comprising: 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

A jacketed cable comprises a conductor; an insulating covering surrounding the conductor; and a jacket surrounding the insulating covering; wherein the jacket comprises a composition comprising 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

The above described and other features are exemplified by the following FIGURE and detailed description.

BRIEF DESCRIPTION OF THE DRAWINGS

The following FIGURE represents an exemplary embodiment, wherein like elements are numbered alike.

FIG. 1 shows (A) a side view and (B) a cross-section of a jacketed cable.

DETAILED DESCRIPTION

The present inventors have determined that use of a liquid ultraviolet absorbing agent can provide good ultraviolet stability of flexible poly(phenylene ether) compositions, while also substantially reducing migration of the ultraviolet absorbing agent to the surface of the composition. These features can be particularly advantageous for flexible, ultraviolet resistant compositions useful for wire and cable applications.

Accordingly, an aspect of the present disclosure is a poly(phenylene ether) composition, comprising 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

The composition comprises a poly(phenylene ether). Poly(phenylene ether)s include those comprising repeating structural units having the formula

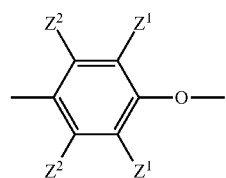

wherein each occurrence of $Z^1$ is independently halogen, or unsubstituted or substituted $C_1$-$C_{12}$ hydrocarbyl provided that the hydrocarbyl group is not tertiary hydrocarbyl, or $C_1$-$C_{12}$ hydrocarbylthio, or $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

The poly(phenylene ether) can comprise a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

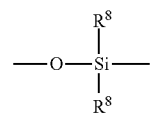

wherein each occurrence of $R^8$ is independently hydrogen, $C_1$-$C_{12}$ hydrocarbyl or $C_1$-$C_{12}$ halohydrocarbyl; and two terminal units having the structure

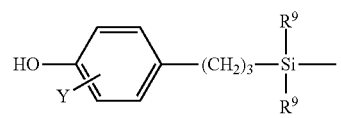

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, and the hydroxyaryl-terminated polysiloxane has the structure

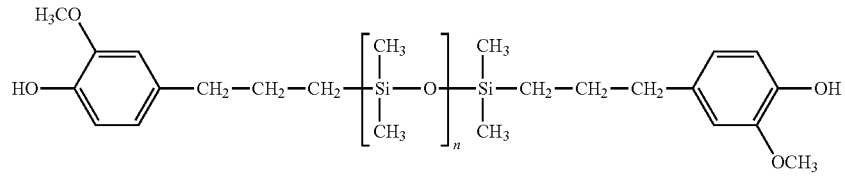

wherein n is, on average, 5 to 100, or 30 to 60.

The oxidative copolymerization method produces poly (phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, or 0.35 to 0.5 deciliter per gram, or 0.4 to 0.5 deciliter per gram. In some embodiments, the poly(phenylene ether) is a poly(2,6-dimethyl-1,4-phenylene ether) having an intrinsic viscosity of 0.35 to 0.5 deciliter per gram. In some embodiments, the poly(phenylene ether) has an intrinsic viscosity of 0.35 to 0.5 deciliter per gram and comprises poly(phenylene ether) homopolymer and poly(phenylene ether)-polysiloxane block copolymer.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether)-polysiloxane block copolymer can, for example, contribute 0.05 to 2 weight percent, or 0.1 to 1 weight percent, or 0.2 to 0.8 weight percent, of siloxane groups to the composition as a whole.

The composition comprises the poly(phenylene ether) in an amount of 15 to 45 parts by weight, based on 100 parts by weight total of flame retardants and polymers other than the poly(alkylene oxide). Within this range, the poly(phenylene ether) amount can be 15 to 35 parts by weight, or 17 to 30 parts by weight.

In addition to the poly(phenylene ether), the composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, or 20 to 35 weight percent, or 25 to 35 weight percent, or 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, or 50 to 80 weight percent, or 60 to 70 weight percent, all based on the weight of the high poly(alkenyl aromatic content) hydrogenated block copolymer.

In some embodiments, the hydrogenated block copolymer has a weight average molecular weight of 40,000 to 400,000 grams per mole. The number average molecular weight and the weight average molecular weight can be determined by gel permeation chromatography and based on comparison to polystyrene standards. In some embodiments, the hydrogenated block copolymer has a weight average molecular weight of 200,000 to 400,000 grams per mole, or 220,000 to 350,000 grams per mole. In other embodiments, the hydrogenated block copolymer has a weight average molecular weight of 40,000 to 200,000 grams per mole, or 40,000 to 180,000 grams per mole, or 40,000 to 150,000 grams per mole.

The alkenyl aromatic monomer used to prepare the hydrogenated block copolymer can have the structure

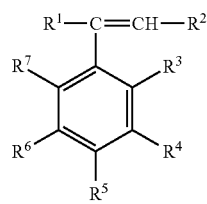

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

The hydrogenated block copolymer can consist of polystyrene-poly(ethylene-butylene)-polystyrene triblock copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene), and from Kuraray as SEPTON™ 8006 (having about 33 weight percent polystyrene) and 8007 (having about 30 weight percent polystyrene); polystyrene-poly(ethylene-butylene-styrene)-polystyrene tapered block copolymers available from Kraton Performance Polymers as KRATON™ A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used.

The composition comprises the hydrogenated block copolymer in an amount of 5 to 40 parts by weight, based on 100 parts by weight total of flame retardants and polymers other than the poly(alkylene oxide). Within this range, the hydrogenated block copolymer can be present in an amount of 7 to 20 parts by weight, or 7 to 17 parts by weight, based on 100 parts by weight total of flame retardants and polymers other than the poly(alkylene oxide).

In addition to the poly(phenylene ether) and the hydrogenated block copolymer, the composition can comprises a polypropylene or a polyethylene. As used herein, the term "polypropylene" refers to a propylene homopolymer. The polypropylene can be atactic, syndiotactic, isotactic, or a combination thereof. In some embodiments, the polypropylene is an atactic polypropylene having a melt flow rate of 4 to 16 grams per 10 minutes, or 5 to 12 grams per 10 minutes, measured at 230° C. and 2.16 kilogram load according to ASTM D1238-13.

Suitable polypropylenes are commercially available as, for example, PP 570P Resin from SABIC, and PP1304E3 Resin from ExxonMobil.

As used herein, the term "polyethylene" can include high density polyethylene (HDPE), low density polyethylene (LDPE), medium density polyethylene (MDPE), and linear low density polyethylene (LLDPE). The density of polyethylene (HDPE, LDPE, MDPE, LLDPE) can be 0.90 gram/$cm^3$ to 0.98 gram/$cm^3$. In some embodiments, the polyethylene is a linear low density polyethylene.

The composition comprises the polypropylene or the polyethylene in an amount of 1 to 15 parts by weight, based on 100 parts by weight total of flame retardants and polymers other than the poly(alkylene oxide). Within this range, the polypropylene or polyethylene amount can be 2 to 7 parts by weight.

In addition to the poly(phenylene ether), the hydrogenated block copolymer, and the polypropylene or the polyethylene, the composition comprises a polybutene having a number average molecular weight of 500 to 1500 grams/mole. As used herein, the term "polybutene" refers to a polymer comprising at least 75 weight percent of units, or at least 80 weight percent of units, derived from 1-butene, 2-butene, 2-methylpropene (isobutene), or a combination thereof. The polybutene may be a homopolymer or a copolymer. In some embodiments, the polybutene consists of units derived from 1-butene, 2-butene, 2-methylpropene (isobutene), or a combination thereof. In other embodiments, the polybutene is a copolymer that comprises 1 to 25 weight percent of repeat units derived from a copolymerizable monomer such as ethylene, propylene, or 1-octene. In some embodiments, the polybutene is a homopolymer of 2-methylpropene. In other embodiments, the polybutene is a copolymer of 2-methylpropene with 1-butene and/or 2-butene. In still other embodiments, the polybutene is a combination of a homopolymer of 2-methylpropene, and a copolymer of 2-methylpropene with 1-butene and/or 2-butene.

The polybutene has a number average molecular weight of 500 to 1500 grams/mole. Number average molecular weight can be determined by gel permeation chromatography using polystyrene standards. Within the range of 500 to 1500 grams/mole, the number average molecular weight can be 600 to 1400 grams/mole, or 600 to 1200 grams/mole.

Suitable polybutenes are commercially available as, for example, INDOPOL™ H-50 Resin from INEOS, and PB800 Resin from Daelim Industrial Co. Ltd.

The composition comprises the polybutene in an amount of 2 to 10 parts by weight, based on 100 parts by weight total of flame retardants and polymers other than the poly(alkylene oxide). Within this range, the polybutene amount can be 3 to 9 parts by weight.

The composition further comprises a flame retardant. A flame retardant is a chemical compound or mixture of chemical compounds capable of improving the flame retardancy of the composition. Suitable flame retardants include organophosphate esters, metal dialkylphosphinates, bis(phenoxy)phosphazenes, nitrogen-containing flame retardants, metal hydroxides, and combinations thereof, preferably metal hydroxides, and combinations thereof.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate)

(CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments, the flame retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula

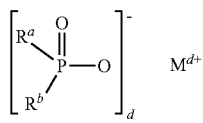

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl, and n-pentyl. In some embodiments, $R^a$ and $R^b$ are ethyl, M is aluminum, and d is 3 (that is, the metal dialkylphosphinate is aluminum tris(diethylphosphinate)).

In some embodiments, the flame retardant comprises a bis(phenoxy)phosphazene. The bis(phenoxy)phosphazene can be oligomeric or polymeric, and it can be cyclic or linear. In some embodiments, the bis(phenoxy)phosphazene is cyclic and has the structure

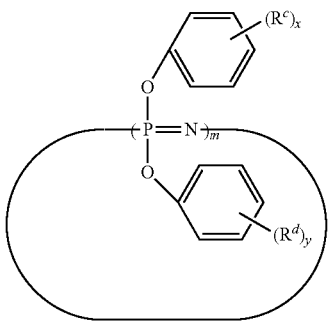

wherein m is an integer of 3 to 25; x and y are each independently 0, 1, 2, 3, 4, or 5; and each occurrence of $R^c$ and $R^d$ is halogen, $C_1$-$C_{12}$ alkyl, or $C_1$-$C_{12}$ alkoxyl.

In other embodiments, the bis(phenoxy)phosphazene is linear and has the structure

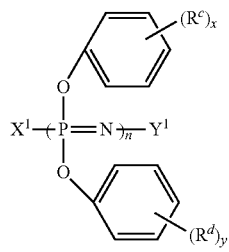

wherein n is an integer from 3 to 10,000; $X^1$ represents a —N=P(OPh)$_3$ group or a N=P(O)(OPh) group wherein Ph represents a phenyl group; $Y^1$ represents a —P(OPh)$_4$ group or a —P(O)(OPh)$_2$ group; x and y are each independently 0, 1, 2, 3, 4, or 5; and each occurrence of $R^c$ and $R^d$ is halogen, $C_1$-$C_{12}$ alkyl, or $C_1$-$C_{12}$ alkoxyl.

In some embodiments, the flame retardant comprises a nitrogen-containing flame retardant. Nitrogen-containing flame retardants include those comprising a nitrogen-containing heterocyclic base and a phosphate or pyrophosphate or polyphosphate acid. In some embodiments, the nitrogen-containing flame retardant has the formula

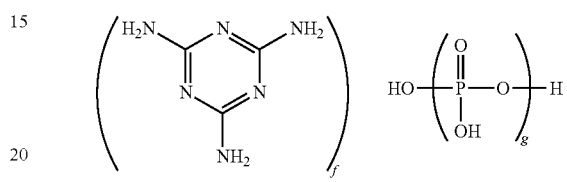

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In some embodiments, the nitrogen-containing flame retardant comprises melamine cyanurate.

In some embodiments, the flame retardant comprises a metal hydroxide. Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0), aluminum oxide hydroxide (for example, CAS Reg. No.

1318-23-6, also known as boehmite), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

In some embodiments, the flame retardant is selected from the group consisting of magnesium dihydroxides, aluminum hydroxides, zinc borate, metal dialkylphosphinates, melamine polyphosphates, and combinations thereof. In some embodiments, the flame retardant comprises a magnesium dihydroxide, an aluminum hydroxide, a zinc borate, an aluminum oxide hydroxide, or a combination comprising at least one of the foregoing. In some embodiments, the flame retardant is a magnesium dihydroxide.

The composition comprises the flame retardant in an amount of 10 to 45 parts by weight, based on 100 parts by weight total of flame retardants and polymers other than the poly(alkylene oxide). In some embodiments, particularly in which the flame retardant comprises a metal hydroxide, the flame retardant amount can be 20 to 40 parts by weight, or 28 to 38 parts by weight. In some embodiments, the composition can optionally further comprise a smoke suppressant, for example a metal borate salt such as zinc borate, alkali metal or alkaline earth metal borate or other borate salts. Additionally other boron containing compounds, such as boric acid, borate esters, boron oxides or other oxygen compounds of boron can be useful.

In a specific embodiment, the composition comprises a metal hydroxide flame retardant, and, optionally, a metal borate smoke suppressant, preferably wherein the metal hydroxide is magnesium dihydroxide and the metal borate is zinc borate.

The composition further comprises an ultraviolet (UV) absorbing agent that has a melting point that is less than or equal to 25° C. In some embodiments, the liquid UV absorbing agent has a melting point that is less than 25° C., or less than or equal to 15° C., or less than or equal to 10° C., or less than 0° C. Stated another way, the ultraviolet absorbing agent is a liquid at room temperature. For brevity, this component can also be referred to as a liquid ultraviolet (UV) absorbing agent. Suitable liquid UV absorbing agents include liquid hydroxyl phenyl benzotriazole ultraviolet absorbing agents, liquid cyanoacrylate ultraviolet absorbing agents, liquid hydroxybenzophenone ultraviolet absorbing agents, liquid hydroxyl phenyl triazine ultraviolet absorbing agents, liquid oxanilide ultraviolet absorbing agents, or a combination comprising at least one of the foregoing provided that the resulting combination is a liquid at a temperature of less than or equal to 25° C. In some embodiments, the liquid ultraviolet absorbing agent is selected from a liquid hydroxyl phenyl benzotriazole ultraviolet absorbing agent, a liquid cyanoacrylate ultraviolet absorbing agent, or a combination thereof. Presently preferred liquid ultraviolet absorbing agents include 2-(2H-benzotriazol-2-yl)-6-dodecyl-4-methyl phenol (CAS Reg. No. 125304-04-3), 2-ethylhexyl-2-cyano-3,3-diphenyl acrylate (CAS Reg. No. 6197-30-4), and combinations of liquid UV absorbing agents comprising at least one of the foregoing.

The composition can exclude any UV absorbing agents that are not room temperature liquids, for example solid UV absorbing agents can be excluded from the composition. For example, the composition can exclude 2,2'-methylene bis[4-(1,1,3,3-tetramethylbutyl)-6-(2H-benzotriazole-2-yl)phenol] (CAS Reg. No. 103597-45-1), 2-(4,6-bis(2,4-dimethylphenyl)-1,3,5-triazin-2-yl)-5-(octyloxy)phenol (CAS Reg. No. 2725-22-6), 2-(4,6-bis((1,1-biphenyl)-4-yl)-1,3,5-triazin-2-yl)-5-((2-ethylhexyl)oxy)phenol (CAS Reg. No. 204583-39-1), 2-(5-chloro-2H-benzotriazole-2-yl)-6-(1,1-dimethylethyl)-4-methyl phenol (CAS Reg. No. 147783-69-5), and the like, or a combination comprising at least one of the foregoing solid ultraviolet absorbing agents.

The composition comprises the liquid UV absorbing agent in an amount of 0.5 to 10 parts by weight, based on 100 parts by weight total of flame retardants and polymers other than the poly(alkylene oxide). Within this range, the ultraviolet absorbing agent amount can be 0.5 to 6 parts by weight, or 1 to 4 parts by weight.

The composition further comprises a poly(alkylene oxide). As used herein, the term "poly(alkylene oxide)" includes homopolymers of $C_2$-$C_4$ alkylene oxides (such as poly(ethylene oxide)s, poly(propylene oxide)s, poly(butylene oxide)s, and homopolymers of $C_2$-$C_4$ alkylene oxides initiated in the presence of a non-corresponding alcohol, such as pentaerythritol), random copolymers of $C_2$-$C_4$ alkylene oxides (such as random copolymers of ethylene oxide and propylene oxide), block copolymers of $C_2$-$C_4$ alkylene oxides (such as diblock and triblock copolymers of ethylene oxide and propylene oxide), mono($C_1$-$C_{12}$)ethers and di($C_1$-$C_{12}$)ethers of the foregoing (such as poly(ethylene oxide) dibutyl ether and poly(propylene oxide) monobutyl ether), mono($C_2$-$C_{12}$)esters and di($C_2$-$C_{12}$)esters of the foregoing (such as poly(ethylene oxide) diacetyl ester and poly(propylene oxide) monopropionyl ester), and combinations thereof. In some embodiments, the poly(alkylene oxide) excludes ester linkages.

In some embodiments, the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof. In a very specific embodiment, the poly(alkylene oxide) comprises a poly(propylene oxide) mono($C_1$-$C_{12}$-alkyl) ether.

In some embodiments, the poly(alkylene oxide) has a number average molecular weight of 300 to 40,000 grams/mole. Within this range, the number average molecular weight can be 300 to 25,000 grams/mole, specifically 500 to 5,000 grams/mole.

The composition comprises the poly(alkylene oxide) in an amount of 0.5 to 10 parts by weight, based on 100 parts by weight total of flame retardants and polymers other than the poly(alkylene oxide). Within this range, the poly(alkylene oxide) amount can be 1 to 6 parts by weight, or 1 to 4 parts by weight.

In some embodiments, the composition further comprises a copolymer of monomers comprising ethylene and a $C_3$-$C_{12}$ alpha-olefin. The $C_3$-$C_{12}$ alpha-olefin can be, for example, 1-butene, 1-hexene, or 1-octene. The $C_3$-$C_{12}$ alpha-olefin content in the copolymer can be, for example, 10 to 50 weight percent. The copolymer can, optionally, further comprise additional monomers, such as maleic anhydride, which can be present in the backbone of the copolymer or as a graft. In some embodiments, the copolymer of monomers comprising ethylene and a $C_3$-$C_{12}$ alpha-olefin comprises a copolymer of ethylene and 1-octene, and a maleic anhydride-grafted copolymer of ethylene and 1-octene.

When present in the composition, the copolymer of monomers comprising ethylene and a $C_3$-$C_{12}$ alpha-olefin can be used in an amount of 5 to 30 parts by weight, based on 100 parts by weight total of flame retardants and polymers other than the poly(alkylene oxide). Within this range, the amount of the copolymer can be 10 to 30 parts by weight, or 20 to 30 parts by weight.

The composition can, optionally, further comprise one or more additives known in the thermoplastics art. For example, the composition can, optionally, further comprise an additive chosen from stabilizers, mold release agents, lubricants, processing aids, drip retardants, hindered amine light stabilizers, cycloaliphatic epoxy resins, dyes, pigments, antioxidants, anti-static agents, mineral oil, metal deactivators, and combinations thereof. When present, such additives are typically used in a total amount of less than or equal to 15 parts by weight, or less than or equal to 12 parts by weight, based on 100 parts by weight total of flame retardants and polymers other than the poly(alkylene oxide). Excluding white pigment, such additives are typically used in a total amount of less than or equal to 5 parts by weight, or less than or equal to 4 parts by weight, or less than or equal to 3 parts by weight, based on 100 parts by weight total of flame retardants and polymers other than the poly(alkylene oxide).

The composition can, optionally, minimize or exclude polymers other than those described herein as required or optional. For example, in some embodiments the composition comprises 0 to 2 parts by weight, or 0 to 1 part by weight, or 0 part by weight, of homopolystyrenes, based on 100 parts by weight total of flame retardants and polymers other than the poly(alkylene oxide). As another example, in some embodiments the composition comprises 0 to 2 parts by weight, or 0 to 1 part by weight, or 0 part by weight, of rubber-modified polystyrenes, based on 100 parts by weight total of flame retardants and polymers other than the poly(alkylene oxide). As another example, in some embodiments the composition comprises 0 to 2 parts by weight, or 0 to 1 part by weight, or 0 part by weight, of polyamides, based on 100 parts by weight total of flame retardants and polymers other than the poly(alkylene oxide).

In a very specific embodiment of the composition, the poly(phenylene ether) comprises a poly(2,6-dimethyl-1,4-phenylene ether) having an intrinsic viscosity of 0.35 to 0.5 deciliter per gram and a poly(2,6-dimethyl-1,4-phenylene ether)-polysiloxane block copolymer having an intrinsic viscosity of 0.35 to 0.5 deciliter per gram; the hydrogenated block copolymer comprises a polystyrene-poly(ethylene/butylene)-polystyrene triblock copolymer; the flame retardant comprises magnesium dihydroxide; the ultraviolet absorbing agent comprises a liquid hydroxyl phenyl benzotriazole ultraviolet absorbing agent, a liquid cyanoacrylate ultraviolet absorbing agent, or a combination comprising at least one of the foregoing; the poly(alkylene oxide) comprises a poly(propylene oxide) mono($C_1$-$C_{12}$-alkyl) ether; the composition further comprises a copolymer of monomers comprising ethylene and a $C_3$-$C_{12}$ alpha-olefin, wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene; and the composition comprises 17 to 30 parts by weight of the poly(phenylene ether), 7 to 17 parts by weight of the hydrogenated block copolymer, 2 to 7 parts by weight of the polypropylene or the polyethylene, 3 to 9 parts by weight of the polybutene, 20 to 30 parts by weight of the copolymer of monomers comprising ethylene and a $C_3$-$C_{12}$ alpha-olefin, 28 to 38 parts by weight of the flame retardant, 1 to 4 parts by weight of the liquid ultraviolet absorbing agent, and 1 to 4 parts by weight of the poly(alkylene oxide).

The composition exhibits a relatively small color shift on exposure to ultraviolet light. For example, in some embodiments the composition exhibits a CIELAB color shift (delta E) of 7 or less, or 6.5 or less, after 300 hours of xenon arc exposure according to ASTM D4459-12. The resistance to ultraviolet light is particularly useful when the composition is light-colored. For example, in some embodiments, the composition exhibits a lightness value, L*, of 70 to 95, or 70 to 90, measured according to ASTM D2244-15a using a D65 standard illuminant.

The composition exhibits a melt flow rate (MFR) of 7 to 25 grams per 10 minutes as determined according to ASTM D1238 at 250° C. and 10 kilogram load over 300 seconds.

The composition exhibits a flexural modulus of 35 to 65 MPa, or 40 to 60 MPa, as determined according to ASTM D790 at 23° C. using bar cross-sectional dimensions of 6.4×12.7 millimeters, and a test speed of 12.5 millimeters/minute.

The composition exhibits a tensile stress at break of 10 to 14 MPa and a tensile elongation at break of 140 to 250%. Tensile properties can be determined according to ASTM D638 at a test speed of 50 mm/min.

The composition can exhibit a Shore A Hardness of 80 to 100, or 85 to 95, as determined according to ASTM D2240.

Another aspect of the present disclosure is an insulated conductor comprising a conductor, and an insulating covering disposed overt the conductor. The insulating covering comprises 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide). All of the above-described variants of the composition apply as well to the insulated conductor.

In a very specific embodiment of the insulated conductor, the poly(phenylene ether) comprises a poly(2,6-dimethyl-1,4-phenylene ether) having an intrinsic viscosity of 0.35 to 0.5 deciliter per gram and a poly(2,6-dimethyl-1,4-phenylene ether)-polysiloxane block copolymer having an intrinsic viscosity of 0.35 to 0.5 deciliter per gram; the hydrogenated block copolymer comprises a polystyrene-poly(ethylene/butylene)-polystyrene triblock copolymer; the flame retardant comprises magnesium dihydroxide; the ultraviolet absorbing agent comprises a liquid hydroxyl phenyl benzotriazole ultraviolet absorbing agent, a liquid cyanoacrylate ultraviolet absorbing agent, or a combination comprising at least one of the foregoing; the poly(alkylene oxide) comprises a poly(propylene oxide) mono($C_1$-$C_{12}$-alkyl) ether; the composition further comprises a copolymer of monomers comprising ethylene and a $C_3$-$C_{12}$ alpha-olefin, wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene; and the composition comprises 17 to 30 parts by weight of the poly(phenylene ether), 7 to 17 parts by weight of the hydrogenated block copolymer, 2 to 7 parts by weight of the polypropylene or the polyethylene, 3 to 9 parts by weight of the polybutene, 20 to 30 parts by weight of the copolymer of monomers comprising ethylene and a $C_3$-$C_{12}$ alpha-olefin, 28 to 38 parts by weight of the flame retardant, 1 to 4 parts by weight of the liquid ultraviolet absorbing agent, and 1 to 4 parts by weight of the poly(alkylene oxide).

Another embodiment is a jacketed cable comprising a conductor, an insulating covering surrounding the conductor, and a jacket surrounding the insulating covering, wherein the jacket comprises a composition comprising 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide). All of the above-described variants of the composition apply as well to the jacketed cable. There is no particular limit on the composition of the insulating covering. In some embodiments, the insulating covering comprises the composition as described herein. In other embodiments, the insulating covering comprises a different flexible composition, such as one of those described in U.S. Patent Application Publication No. US 2006/0131052 A1 of Mhetar et al. In still other embodiments, the insulating covering comprises a foamed thermoplastic composition.

A side view and a cross-sectional view of a jacketed cable is presented in FIGS. 1 (A) and (B), respectively, wherein jacketed cable 10 includes a conductor 12, an insulating covering 14 surrounding the conductor, and jacket 16 surrounding the insulating covering 14. The jacketed cable can be formed by extrusion coating of conductor 12, with either step-wise or simultaneous extrusion of the conductor with the covering and the jacket.

In a very specific embodiment of the jacketed cable, the poly(phenylene ether) comprises a poly(2,6-dimethyl-1,4-phenylene ether) having an intrinsic viscosity of 0.35 to 0.5 deciliter per gram and a poly(2,6-dimethyl-1,4-phenylene ether)-polysiloxane block copolymer having an intrinsic viscosity of 0.35 to 0.5 deciliter per gram; the hydrogenated block copolymer comprises a polystyrene-poly(ethylene/butylene)-polystyrene triblock copolymer; the flame retardant comprises magnesium dihydroxide; the ultraviolet absorbing agent comprises a liquid hydroxyl phenyl benzotriazole ultraviolet absorbing agent, a liquid cyanoacrylate ultraviolet absorbing agent, or a combination comprising at least one of the foregoing; the poly(alkylene oxide) comprises a poly(propylene oxide) mono($C_1$-$C_{12}$-alkyl) ether; the composition further comprises a copolymer of monomers comprising ethylene and a $C_3$-$C_{12}$ alpha-olefin, wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene; and the composition comprises 17 to 30 parts by weight of the poly(phenylene ether), 7 to 17 parts by weight of the hydrogenated block copolymer, 2 to 7 parts by weight of the polypropylene or the polyethylene, 3 to 9 parts by weight of the polybutene, 20 to 30 parts by weight of the copolymer of monomers comprising ethylene and a $C_3$-$C_{12}$ alpha-olefin, 28 to 38 parts by weight of the flame retardant, 1 to 4 parts by weight of the liquid ultraviolet absorbing agent, and 1 to 4 parts by weight of the poly(alkylene oxide).

The composition, insulated conductor and the jacketed cable can advantageously exhibit reduced surface blooming, attributed to the use of a liquid UV absorbing agent. The phenomenon of "blooming" is a common problem for polymer compositions, as incompatible materials can migrate to the surface of a molded part, resulting in "blooming". Surface blooming defects tend to have a negative effect on the aesthetic properties of materials, and can impact performance. For example, a molded part comprising the composition, the insulated conductor, and the jacketed cable of the present disclosure can exhibit significantly less surface blooming relative to a molded part, an insulated conductor, or a jacketed cable comprising a composition including a solid UV absorbing agent.

This disclosure is further illustrated by the following examples, which are non-limiting.

Examples

Materials used for the following examples are summarized in Table 1.

TABLE 1

| | Component Description |
|---|---|
| PPE-Si/PPE | A mixture of poly(2,6-dimethyl-1,4-phenylene ether) (CAS Reg. No. 24938-67-8) and poly(2,6-dimethyl-1,4-phenylene ether-polydimethylsiloxane block copolymer (CAS Reg. No. 1202019-56-4), the mixture having a polysiloxane content of about 5 weight percent and an intrinsic viscosity of about 0.40 deciliter per gram as measured in chloroform at 25° C.; prepared according to the procedure of U.S. Pat. No. 8,017,697 to Carrillo et al., Example 16. |
| PP | Propylene homopolymer, CAS Reg. No. 9003-07-0, having a melt mass-flow rate of 8 grams per 10 minutes, measured according to ASTM D1238 at 230° C. and a 2.16 kilogram load; obtained as PP 570P from SABIC Innovative Plastics. |
| LLDPE | Linear low density polyethylene, CAS Reg. No. 25087-34-7, having a melt flow rate of about 20 grams per 10 minutes at 190° C. and 2.16 kilogram load; obtained as LLDPE M200024 from SABIC. |
| Mg(OH)$_2$ | Magnesium dihydroxide, CAS Reg. No. 1309-42-8, surface treated with aminosiloxane; obtained as MAGNIFIN ™ H-5IV from Albemarle. |
| PB | Polybutene, CAS Reg. No. 9003-29-6, having a kinematic viscosity of 100-125 centistokes at 100° C.; obtained as INDOPOL ™ H-50 from INEOS. |
| Erucamide | Erucamide, CAS Reg. No. 112-84-5; obtained as KEMAMIDE ™ E Ultra from Crompton Corp. |

TABLE 1-continued

| | Component Description |
|---|---|
| Antioxidant-1 | Reaction products of phosphorus trichloride with 1,1'-biphenyl and 2,4-bis(1,1-dimethylethyl)phenol, CAS Reg. No. 119345-01-6; obtained as HOSTANOX ™ P-EPQ ™ from Clariant. |
| Antioxidant-2 | Octadecyl 3,5-di-tert-butyl-4-hydroxyhydrocinnamate, CAS Reg. No. 2082-79-3; obtained as IRGANOX 1076 from BASF. |
| Antioxidant-3 | Pentaerythritol 3-(4-hydroxy-3,5-di-tert-butylphenyl)propionate (1:4), CAS Reg. No. 6683-19-8; obtained as IRGANOX 1010 from BASF Corp. |
| Antioxidant-4 | Tris(2,4-di-tert-butylphenyl) phosphite, CAS Reg. No. 31570-04-4; obtained as IRGAFOS ™ 168 from BASF Corp. |
| Metal Deactivator | 2',3-bis[[3-[3, 5-di-tert-butyl-4-hydroxyphenyl]propionyl]] propionohydrazide, CAS Reg. No. 32687-78-8; obtained as IRGANOX ™ MD 1024 from BASF. |
| Fragrance | A polyethylene encapsulated fragrance; obtained as IFI-7191 PBD from International Flavors and Fragrances, Inc. |
| $TiO_2$ | Titanium dioxide, CAS Reg. No. 13463-67-7, obtained as Ti-Pure ™ R 103-15 from DuPont. |
| CB | Carbon black (pigment); pH = 7.85; heating loss = 1.87 weight percent; sulfur = 0.45 weight percent; iodine absorption = 230.8 grams/kilogram; toluene discoloration number = 99.5 percent transmittance; solvent extractables = 0.01 weight percent; volatile constituents = 1.85 weight percent; obtained as Monarch 800 from Cabot Corp. |
| Pigment Blue 29 | Pigment Blue 29, CAS Reg. No. 57455-37-5; obtained as Ultramarine 5085 from Holliday Pigments, a division of Huntsman. |
| Pigment Red 101 | Pigment red 101 (iron (III) oxide), CAS Reg. No. 1309-37-1; obtained as BAYFERROX ™ 180M or BAYFERROX ™ 110M from Lanxess Corp or COLORTHERM ™ Red 180M from Bayer. |
| UVA-1 | 2,2'-Methylene bis[4-(1,1,3,3-tetramethylbutyl)-6-(2H-benzotriazole-2-yl)phenol], CAS Reg. No. 103597-45-1; obtained as TINUVIN ™ 360 from BASF. |
| UVA-2 | 2-14,6-bis([1,1'-biphenyl]-4-yl)-1.3.5-triazin-2-yl]-5-[(2-ethythexyl)oxy]-phenol, CAS Reg. No. 204583-39-1: obtained as TINUVIN ™ 1600 from BASF. |
| UVA-3 | 2-(2H-Benzotriazol-2-yl)-6-dodecyl-4-methyl phenol, CAS Reg. No. 125304-04-3; obtained as CHIGUARD 5571 from Chitec Technology Corp. |
| UVA-4 | 2-Ethylhexyl- 2-cyano-3,3-diphenyl acrylate, CAS Reg. No. 6197-30-4; obtained as CHIGUARD 336 from Chitec Technology Corp. |
| UVA-5 | 2-(5-chloro-2H-benzotriazole-2-yl)-6-(1,1-dimethylethyl)-4-methyl phenol, CAS Reg. No. 147783-69-5; obtained as HOSTAVIN PR-31P from Clariant. |
| UVA-6 | Hexadecyl 3,5-di-tert-butyl-4-hydroxybenzoate, CAS Reg. No. 67845-93-6; obtained as CHIGUARD 1108 from Chitec Technology Corp. |
| SEBS 1 | Polystyrene-poly(ethylene-butylene)-polystyrene triblock copolymer, CAS Reg. No. 66070-58-4, having a polystyrene content of about 30-33 weight percent and a negligible melt flow, measured at 260° C. and 5 kilogram load according to ASTM D1238; obtained as KRATON G1651 from Kraton Performance Polymers Inc. |
| SEBS 2 | Polystyrene-poly(ethylene-butylene)-polystyrene triblock copolymer, CAS Reg. No. 66070-58-4, having a polystyrene content of about 27.7-30.7 weight percent; obtained as KRATON ™ G1650 from Kraton Performance Polymers Inc. |
| POE-1 | Poly(ethylene-co-l-octene), CAS Reg. No. 26221-73-8, having a melt flow of 1.1 grams per 10 minutes, measured at 190° C. and 2.16 kilogram load according to ISO 1133; obtained as Exact 8201 from Exxon Mobil. |
| POE-2 | Poly(ethylene-co-l-octene), CAS Reg. No. 26221-73-8, having a melt flow of 10 grams per 10 minutes, measured at 190° C. and 2.16 kilogram load according to ISO 1133; obtained as Exact 8210 from Exxon Mobil. |
| POE-g-MAH | Maleic anhydride-grafted poly(ethylene-co-l-octene), having a melt flow rate of 1.6 grams per 10 minutes, measured at 190° C. and 2.16 kilogram load according to ASTM D1238; obtained as FUSABOND ™ N493 from DuPont. |
| PPO | Poly(propylene glycol) monobutyl ether, CAS Reg. No. 9003-13-8, having an average molecular weight of 1100 grams per mole; obtained as Polyglykol B01/40 from Clariant. |
| P(EO-PO) | Ethylene glycol-propylene glycol block copolymer, CAS Reg. No. 691397-13-4, having an average molecular weight of 11,400; obtained as PLURONIC F88 from BASF Corp. |

The compositions of the following examples were prepared by compounding on a 37 mm Toshiba SE twin screw extruder. All materials were blended together and fed by the main feeder. The strand of extruded composition was cut into pellets and dried for further molding or wire extrusion. Compounding conditions that were used are summarized in Table 2.

TABLE 2

| Extrusion | Unit | Set Values |
|---|---|---|
| Zone 1 Temp | °C. | 50 |
| Zone 2 Temp | °C. | 180 |
| Zone 3 Temp | °C. | 225 |
| Zone 4 - 11 Temp | °C. | 245 |
| Die Temp | °C. | 255 |
| Screw speed | rpm | 450 |
| Throughput | kg/hr | 30 |

The molding conditions that were used are summarized in Table 3.

TABLE 3

| Molding | Unit | Set Values |
|---|---|---|
| Cnd: Pre-drying time | Hour | 4 |
| Cnd: Pre-drying temp | °C. | 80 |
| Zone 1 temp | °C. | 240 |
| Zone 2 temp | °C. | 250 |
| Zone 3 temp | °C. | 250 |
| Nozzle temp | °C. | 250 |
| Mold temp | °C. | 40 |
| Injection speed | mm/s | 25 |
| Holding pressure | kgf/cm$^2$ | 600 |
| Max. Injection pressure | kgf/cm$^2$ | 1000 |

The ASTM and UL tests used to characterize the compositions of the examples are summarized below in Table 4.

TABLE 4

| Test | Description |
|---|---|
| MFR | Melt flow rate was determined according to ASTM D1238 at 250° C. and 10 kilogram load over 300 seconds. |
| Flexural Modulus | Flexural properties were determined according to ASTM D790 at 23° C. using bar cross-sectional dimensions of 6.4 × 12.7 millimeters, and a test speed of 12.5 millimeters/minute. |
| Tensile Modulus | Tensile properties were determined according to ASTM D638 at a test speed of 50 mm/min. |
| Hardness | Shore A Hardness was determined according to ASTM D2240 using two overlapping color chips with overall thickness of 6.4 mm and the hardness was read at 30 seconds. |
| Color | CIELAB color parameters L*, a*, and b* were determined according to ASTM D2255 using a D65 light source. |
| UV Aging | UV aging was tested with an exposure time of 300 hours and the color of the composite chip was measured every 100 hours. Suitable compositions of the present disclosure have a 300 hour color shift of 12 or less. |
| Wire Tensile Properties | Wire tensile properties were determined using a test speed of 250 mm/min at 23° C. for 24 hours of 80° C. for 168 hours. |
| Vertical Flame Test | Vertical flame test was conducted according to EN 50265-2-1. |
| Surface blooming test | Cable/wire samples having a length of 1 meter were conditioned under predetermined time and temp., wiped with a black cotton cloth. Powder on the cloth was used to determine the rating of severity of surface blooming. Rating of 0 = no surface blooming; rating of 5 = severe surface blooming. |

Wire and cable samples were prepared for testing. Wire samples had an outer diameter of 2.7 millimeters and used a copper conductor having an outer diameter of 1.16 millimeters. The wire samples were extruded using a melt temperature of 240° C. without preheating of the conductor. The line speed was set to 60 meters per minute. The copper conductor used was AWG18 copper (0.16 mm×41 stranded copper) with a diameter of 1.16 millimeters.

Cable samples (H03 Z1Z1 HF (Halogen-free) Cable) is a type of VDE cable having a configuration as shown in FIG. 1. The insulation layer had an outer diameter of 2.25 millimeters which were extruded at 240° C. with the conductor being AWG18 copper (without preheating). The H03 cable was extruded with 2 parallel insulations inside at 245° C. The line speed was set to 20 meters per minute.

Cable tensile elongation values were determined as follows. Two insulated wires were removed from a length of cable to leave only jacket. The jacket was secured on the clamps of the tensile machine with a gage length of 50 millimeters and tested at the speed of 250 millimeters/minute. The tensile elongation values were for elongation at break.

The cable vertical flame test was conducted according to EN50265-2-1. The test piece (complete cable) was secured to two horizontal supports so that the distance between the bottom of the upper support and the top of the lower support was 550±5 millimeters. The fire was applied in an angle of 45° C. to the vertical axis of the sample and lasted for 60 seconds. A sample passes the test if the distance between the lower edge of the top support and the onset of charring is greater than 50 millimeters. In addition, a sample fails the test if the burning extends downward to a point greater than 540 mm from the lower edge of the top support.

Compositions and properties are summarized in Table 5. For each composition, component amounts are expressed in parts by weight per 100 parts by weight total of polymers (PPE-Si, SEBS 1651, SEBS 1650, PP, PB, LLDPE, POE-1, POE-2, POE-g-MAH) and flame retardants (Mg(OH)$_2$). Note that poly(alkylene oxide)s are not included in the polymers component of the 100 parts by weight polymers and flame retardants. "CE" denotes a Comparative Example and "E" denotes an examples according to the present disclosure.

TABLE 5

| | Units | CE1 | CE2 | CE3 | CE4 | CE5 | E1 | E2 | E3 | E4 | E5 | E6 | E7 | E8 | E9 | E10 | E11 | E12 |
|---|---|---|---|---|---|---|---|---|---|---|---|---|---|---|---|---|---|---|
| Component | | | | | | | | | | | | | | | | | | |
| PPE-Si/PPE | pbw | 23.00 | 22.45 | 22.45 | 22.45 | 22.45 | 22.45 | 22.45 | 22.45 | 23.47 | 22.45 | 22.45 | 22.45 | 22.45 | 22.45 | 22.45 | 22.45 | 22.45 |
| SEBS 1 | pbw | 6.00 | 6.12 | 6.12 | 6.12 | 6.12 | 6.12 | 6.12 | 6.12 | 6.12 | 6.12 | 6.12 | 6.12 | 6.12 | 6.12 | 6.12 | 6.12 | 6.12 |
| SEBS 2 | pbw | 6.00 | 6.12 | 6.12 | 6.12 | 6.12 | 6.12 | 6.12 | 6.12 | 6.12 | 6.12 | 6.12 | 6.12 | 6.12 | 6.12 | 6.12 | 6.12 | 6.12 |
| PP | pbw | 3.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| PB | pbw | 5.00 | 5.10 | 5.10 | 5.10 | 5.10 | 5.10 | 5.10 | 5.10 | 5.10 | 5.10 | 5.10 | 5.10 | 5.10 | 5.10 | 5.10 | 5.10 | 5.10 |
| LLDPE | pbw | 0.00 | 3.06 | 3.06 | 3.06 | 3.06 | 0.00 | 0.00 | 3.06 | 3.06 | 3.06 | 3.06 | 3.06 | 3.06 | 3.06 | 3.06 | 3.06 | 3.06 |
| POE-1 | pbw | 7.00 | 7.14 | 7.14 | 7.14 | 7.14 | 7.14 | 7.14 | 7.14 | 7.14 | 7.14 | 7.14 | 7.14 | 7.14 | 7.14 | 7.14 | 7.14 | 7.14 |
| POE-2 | pbw | 12.00 | 12.24 | 12.24 | 12.24 | 12.24 | 12.24 | 12.24 | 12.24 | 12.24 | 12.24 | 12.24 | 12.24 | 12.24 | 12.24 | 12.24 | 12.24 | 19.39 |
| MAH-g-POE | pbw | 5.00 | 5.10 | 5.10 | 5.10 | 5.10 | 5.10 | 5.10 | 5.10 | 5.10 | 5.10 | 5.10 | 5.10 | 5.10 | 5.10 | 5.10 | 5.10 | 5.10 |
| Mg(OH)2 | pbw | 33.00 | 32.65 | 32.65 | 32.65 | 32.65 | 32.65 | 32.65 | 32.65 | 31.63 | 32.65 | 32.65 | 32.65 | 32.65 | 32.65 | 32.65 | 32.65 | 32.65 |
| Antioxidant-1 | pbw | 0.25 | 0.26 | 0.26 | 0.26 | 0.26 | 0.51 | 0.51 | 0.26 | 0.26 | 0.26 | 0.26 | 0.26 | 0.26 | 0.26 | 0.26 | 0.26 | 0.26 |
| Antioxidant-2 | pbw | 0.00 | 0.77 | 0.00 | 0.77 | 0.00 | 0.00 | 0.00 | 0.00 | 0.00 | 0.00 | 0.77 | 0.77 | 0.77 | 0.41 | 0.77 | 0.77 | 0.00 |
| Antioxidant-3 | pbw | 0.00 | 0.00 | 0.77 | 0.00 | 0.77 | 0.00 | 0.00 | 0.77 | 0.7 | 0.77 | 0.00 | 0.00 | 0.00 | 0.36 | 0.00 | 0.00 | 0.77 |
| Antioxidant-4 | pbw | 0.75 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| UVA-1 | pbw | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| UVA-2 | pbw | 0.00 | 0.00 | 0.00 | 1.02 | 2.04 | 0.00 | 0.00 | 0.00 | 0.00 | 0.00 | 0.00 | 0.00 | 0.00 | 0.00 | 0.00 | 0.00 | 0.00 |
| UVA-3 | pbw | 0.00 | 0.00 | 0.00 | 0.00 | 0.00 | 2.04 | 0.00 | 2.04 | 2.04 | 0.00 | 0.00 | 0.00 | 2.04 | 0.00 | 2.55 | 2.55 | 0.00 |
| UVA-4 | pbw | 0.00 | 0.00 | 0.00 | 0.00 | 0.00 | 0.00 | 2.04 | 0.00 | 0.00 | 2.04 | 2.04 | 0.00 | 0.00 | 2.04 | 0.00 | 0.00 | 2.55 |
| UVA-5 | pbw | 0.00 | 2.04 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| UVA-6 | pbw | 0.00 | 0.00 | 2.04 | 0.00 | 0.00 | 0.00 | 0.00 | 0.00 | 0.00 | 0.00 | 0.00 | 0.00 | 0.00 | 0.00 | 0.00 | 0.00 | 0.00 |
| PPO | pbw | 0.00 | 2.04 | 2.04 | 2.04 | 2.04 | 2.04 | 2.04 | 2.04 | 2.04 | 2.04 | 2.04 | 0.00 | 0.00 | 2.04 | 2.55 | 3.57 | 3.57 |
| P(EO-PO) | pbw | 0.00 | 0.00 | 0.00 | 0.00 | 0.00 | 0.00 | 0.00 | 0.00 | 0.00 | 0.00 | 0.00 | 2.04 | 2.04 | 0.00 | 0.00 | 0.00 | 0.00 |
| Erucamide | pbw | 0.30 | 0.00 | 0.00 | 0.00 | 0.31 | 0.31 | 0.31 | 0.00 | 0.31 | 0.15 | 0.15 | 0.15 | 0.15 | 0.00 | 0.15 | 0.15 | 0.31 |
| Fragrance | pbw | 0.06 | 0.06 | 0.06 | 0.06 | 0.06 | 0.06 | 0.06 | 0.06 | 0.06 | 0.06 | 0.06 | 0.06 | 0.06 | 0.06 | 0.06 | 0.06 | 0.06 |
| TiO2 | pbw | 8.18 | 6.29 | 6.29 | 6.29 | 7.80 | 8.35 | 8.35 | 6.29 | 6.29 | 6.29 | 6.29 | 6.29 | 6.29 | 6.29 | 6.29 | 6.29 | 6.29 |
| CB | pbw | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Pigment Blue 29 | pbw | 0.10 | 0.08 | 0.08 | 0.08 | 0.11 | 0.11 | 0.11 | 0.08 | 0.08 | 0.08 | 0.08 | 0.08 | 0.08 | 0.08 | 0.08 | 0.08 | 0.08 |
| Pigment Red 101 | pbw | 0.07 | 0.06 | 0.06 | 0.06 | 0.08 | 0.08 | 0.08 | 0.06 | 0.06 | 0.06 | 0.06 | 0.06 | 0.06 | 0.06 | 0.06 | 0.06 | 0.06 |
| Properties | | | | | | | | | | | | | | | | | | |
| MFR | g/10 min | 3.6 | 9.5 | 9.7 | 9.2 | 11.4 | 7.9 | 9.3 | 9.1 | 12.5 | 10.0 | 10.1 | 11.2 | 9.8 | 11.2 | 15.1 | 15.0 | 20.3 |
| Flex. Modulus | MPa | 44 | 53 | 46 | 50 | 55 | 43 | 66 | 44 | 44 | 57 | 55 | 40 | 50 | 58 | 42 | 45 | 60 |
| Tens. Stress @ Brk | MPa | 13.7 | 12.7 | 12.9 | 13.6 | 12.9 | 13.2 | 12.3 | 12.6 | 12.8 | 12.5 | 12.9 | 12.4 | 10.8 | 11.6 | 11.2 | 10.9 | 10.5 |
| Tens. Elong. @ Brk | % | 200 | 166 | 170 | 186 | 151 | 250 | 167 | 176 | 158 | 142 | 179 | 218 | 144 | 144 | 184 | 183 | 153 |
| Shore A Hardness | — | 88 | 89 | 88 | 89 | 89 | 86 | 89 | 88 | 88 | 89 | 89 | 87 | 88 | 90 | 86 | 86 | 88 |
| Wire Tens. Elong.[1] | % | 232 | 207 | 274 | 268 | 245 | 292 | 244 | 275 | 252 | 226 | 287 | 253 | 229 | 210 | 291 | 294 | 220 |
| Wire Tens. Elong.[2] | % | 205 | 201 | 240 | 218 | 210 | 253 | 227 | 219 | 215 | 188 | 248 | 226 | 202 | 185 | 248 | 246 | 211 |
| VDE (H03) | — | Pass | Pass | Pass | Pass | Pass | Pass | Pass | Pass | Pass | Pass | Pass | Pass | Pass | Pass | ND | ND | ND |
| ΔE | — | 2.9 | ND | 7.5 | ND | 3.1 | 4 | 3.6 | 6.3 | ND | 5.3 | 3.2 | ND | 10.1 | 5.3 | 2.4 | 0.8 | 0.8 |
| Surface Blooming | — | 5 | 5 | 4 | 3 | 3 | 0 | 0 | 1 | 1 | 1 | 0 | 0 | 0 | 1 | ND | ND | ND |

ND = Not determined;
[1]Wire tensile elongation determined at 250 mm/min, 23° C., 24 h;
[2]Wire tensile elongation determined at 250 mm/min, 80° C., 16 h Comparative examples 1-5 are compositions including solid UV absorbers. Comparative examples 1, 2, and 5 using UVA-1, -5, and -2, respectively, each showed surface blooming due to the use of the UVA powder. As shown in comparative example 3, using a solid UVA (UVA-6) together with a long polyolefin chain does not solve the blooming issue. Additionally, decreasing the UVA loading also does not solve the problem of surface blooming as shown by comparative example 5 vs. 4.

In contrast, using a liquid UVA (UVA-3 or -4) improved the surface blooming of the compositions. Additionally, the compositions including the liquid UVA maintained a good overall balance of properties as shown by examples 1-12 in Table 5. Thus the compositions according to the present disclosure including a liquid UVA are suitable for use in cable applications.

This disclosure further encompasses the following aspects, which are non-limiting.

Aspect 1: A poly(phenylene ether) composition comprising 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

Aspect 2: The composition of aspect 1, wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer.

Aspect 3: The composition of aspect 1 or 2, wherein the flame retardant comprises a magnesium dihydroxide, an aluminum hydroxide, an aluminum oxide hydroxide, or a combination comprising at least one of the foregoing, preferably a magnesium dihydroxide.

Aspect 4: The composition of any one or more of aspects 1 to 3, further comprising a smoke suppressant, preferably wherein the smoke suppressant is a metal borate, more preferably wherein the metal borate comprises zinc borate.

Aspect 5: The composition of any one or more of aspects 1 to 4, wherein the liquid ultraviolet absorbing agent is a liquid hydroxyl phenyl benzotriazole ultraviolet absorbing agent, a liquid cyanoacrylate ultraviolet absorbing agent, a liquid hydroxybenzophenone ultraviolet absorbing agent, a liquid hydroxyl phenyl triazine ultraviolet absorbing agent, a liquid oxanilide ultraviolet absorbing agent, or a combination comprising at least one of the foregoing.

Aspect 6: The composition of any one or more of aspects 1 to 5, wherein the poly(alkylene oxide) is a poly(ethylene oxide), a poly(propylene oxide), a random copolymer of ethylene oxide and propylene oxide, a block copolymer of ethylene oxide and propylene oxide, a monoalkyl ether of the foregoing, a dialkyl ether of the foregoing, or a combination comprising at least one of the foregoing.

Aspect 7: The composition of any one or more of aspects 1 to 6, wherein the poly(alkylene oxide) has a number average molecular weight of 300 to 40,000 grams per mole.

Aspect 8: The composition of any one or more of aspects 1 to 7, wherein the poly(alkylene oxide) comprises a poly(propylene oxide) mono ($C_{1-12}$ alkyl) ether.

Aspect 9: The composition of any one or more of aspects 1 to 8, further comprising 5 to 30 parts by weight of a copolymer of monomers comprising ethylene and a $C_{3-12}$ alpha olefin.

Aspect 10: The composition of aspect 9, wherein the copolymer comprising a copolymer of ethylene and 1-octene, and a maleic anhydride-grafted copolymer of ethylene and 1-octene.

Aspect 11: The composition of any one or more of aspects 1 to 10, wherein the hydrogenated block copolymer comprises a polystyrene-poly(ethylene/butylene)-polystyrene triblock copolymer.

Aspect 12: The composition of aspect 1, comprising: 17 to 30 parts by weight of the poly(phenylene ether), 7 to 17 parts by weight of the hydrogenated block copolymer, 2 to 7 parts by weight of the polypropylene or the polyethylene, wherein the polyethylene comprises linear low density polyethylene, 3 to 9 parts by weight of the polybutene, 15 to 25 parts by weight of a copolymer of monomers comprising ethylene and a $C_{3-12}$ alpha olefin, 28 to 38 parts by weight of the flame retardant, 1 to 4 parts by weight of the liquid ultraviolet absorbing agent, and 1 to 4 parts by weight of the poly(alkylene oxide).

Aspect 13: The composition of aspect 12, wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer; wherein the flame retardant comprises magnesium dihydroxide; wherein the hydrogenated hydrogenated block copolymer comprises a polystyrene-poly(ethylene/butylene)-polystyrene triblock copolymer; wherein the liquid ultraviolet absorbing agent comprises a liquid hydroxyl phenyl benzotriazole ultraviolet absorbing agent, a liquid cyanoacrylate ultraviolet absorbing agent, or a combination comprising at least one of the foregoing; wherein the poly(alkylene oxide) comprises a poly(propylene oxide) mono($C_{1-12}$ alkyl ether); and wherein the copolymer of monomers comprising ethylene and a $C_{3-12}$ alpha olefin comprises a copolymer of ethylene and 1-octene, and a maleic anhydride-grafted copolymer of ethylene and 1-octene.

Aspect 14: The composition of any one or more of aspects 1 to 13, further comprising an additive composition comprising one or more of stabilizers, mold release agents, lubricants, processing aids, drip retardants, hindered amine light stabilizers, cycloaliphatic epoxy resins, dyes, pigments, antioxidants, anti-static agents, mineral oil, metal deactivators, and combinations comprising at least one of the foregoing.

Aspect 15: An insulated conductor comprising: a conductor; and an insulating covering disposed over the conductor; wherein the insulating covering comprises a poly(phenylene ether) composition comprising: 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

Aspect 16: The insulated conductor of aspect 15, wherein the composition comprises 17 to 30 parts by weight of the poly(phenylene ether), 7 to 17 parts by weight of the hydrogenated block copolymer, 2 to 7 parts by weight of the polypropylene or the polyethylene, wherein the polyethylene comprises linear low density polyethylene, 3 to 9 parts by weight of the polybutene, 15 to 25 parts by weight of a copolymer of monomers comprising ethylene and a $C_{3-12}$ alpha olefin, 28 to 38 parts by weight of the flame retardant, 1 to 4 parts by weight of the liquid ultraviolet absorbing agent, and 1 to 4 parts by weight of the poly(alkylene oxide).

Aspect 17: The insulated conductor of aspect 16, wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer; wherein the flame retardant comprises magnesium dihydroxide; wherein the hydrogenated hydrogenated block copolymer comprises a polystyrene-poly(ethylene/butylene)-polystyrene triblock copolymer; wherein the liquid ultraviolet absorbing agent comprises a liquid hydroxyl phenyl benzotriazole ultraviolet absorbing agent, a liquid cyanoacrylate ultraviolet absorbing agent, or a combination comprising at least one of the foregoing; wherein the poly(alkylene oxide) comprises a poly(propylene oxide) mono($C_{1-12}$ alkyl ether); and wherein the copolymer of monomers comprising ethylene and a $C_{3-12}$ alpha olefin comprises a copolymer of ethylene and 1-octene, and a maleic anhydride-grafted copolymer of ethylene and 1-octene.

Aspect 18: A jacketed cable, comprising: conductor; an insulating covering surrounding the conductor; and a jacket surrounding the insulating covering; wherein the jacket comprises a composition comprising 15 to 45 parts by weight a poly(phenylene ether); 5 to 50 parts by weight of a hydrogenated block copolymer of an alkenyl aromatic monomer and a conjugated diene; 0 to 15 parts by weight of a polypropylene or a polyethylene; 2 to 10 parts by weight of a polybutene having a number average molecular weight of 500 to 1500 grams per mole; 10 to 45 parts by weight of a flame retardant; 0.5 to 10 parts by weight of a liquid ultraviolet absorbing agent having a melting point that is less than or equal to 25° C.; and 0.5 to 10 parts by weight of a poly(alkylene oxide); wherein all parts by weight are based on 100 parts by weight total of flame retardants and polymers other than the poly(alkylene oxide).

Aspect 19: The jacketed cable of aspect 18, wherein the composition comprises 17 to 30 parts by weight of the poly(phenylene ether), 7 to 17 parts by weight of the hydrogenated block copolymer, 2 to 7 parts by weight of the polypropylene or the polyethylene, wherein the polyethylene comprises linear low density polyethylene, 3 to 9 parts by weight of the polybutene, 15 to 25 parts by weight of a copolymer of monomers comprising ethylene and a $C_{3-12}$ alpha olefin, 28 to 38 parts by weight of the flame retardant, 1 to 4 parts by weight of the liquid ultraviolet absorbing agent, and 1 to 4 parts by weight of the poly(alkylene oxide).

Aspect 20: The jacketed cable of aspect 19, wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer; wherein the flame retardant comprises magnesium dihydroxide; wherein the hydrogenated hydrogenated block copolymer comprises a polystyrene-poly(ethylene/butylene)-polystyrene triblock copolymer; wherein the liquid ultraviolet absorbing agent comprises a liquid hydroxyl phenyl benzotriazole ultraviolet absorbing agent, a liquid cyanoacrylate ultraviolet absorbing agent, or a combination comprising at least one of the foregoing; wherein the poly(alkylene oxide) comprises a poly(propylene oxide) mono($C_{1-12}$ alkyl ether); and wherein the copolymer of monomers comprising ethylene and a $C_{3-12}$ alpha olefin comprises a copolymer of ethylene and 1-octene, and a maleic anhydride-grafted copolymer of ethylene and 1-octene.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, -Call, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A poly(phenylene ether) composition comprising
   15 to 45 parts by weight a poly(phenylene ether);
   5 to 50 parts by weight of a hydrogenated block copolymer of an alkenyl aromatic monomer and a conjugated diene;
   0 to 15 parts by weight of a polypropylene or a polyethylene;
   2 to 10 parts by weight of a polybutene having a number average molecular weight of 500 to 1500 grams per mole;
   10 to 45 parts by weight of a flame retardant;
   0.5 to 10 parts by weight of a liquid ultraviolet absorbing agent having a melting point that is less than or equal to 25° C.; and
   0.5 to 10 parts by weight of a poly(alkylene oxide);
   wherein all parts by weight are based on 100 parts by weight total of flame retardants and polymers other than the poly(alkylene oxide).

2. The composition of claim 1, wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer.

3. The composition of claim 1, wherein the flame retardant comprises a magnesium dihydroxide, an aluminum hydroxide, an aluminum oxide hydroxide, or a combination comprising at least one of the foregoing.

4. The composition of claim 1, further comprising a smoke suppressant.

5. The composition of claim 1, wherein the liquid ultraviolet absorbing agent is a liquid hydroxyl phenyl benzotriazole ultraviolet absorbing agent, a liquid cyanoacrylate ultraviolet absorbing agent, a liquid hydroxybenzophenone ultraviolet absorbing agent, a liquid hydroxyl phenyl triazine ultraviolet absorbing agent, a liquid oxanilide ultraviolet absorbing agent, or a combination comprising at least one of the foregoing.

6. The composition of claim 1, wherein the poly(alkylene oxide) is a poly(ethylene oxide), a poly(propylene oxide), a random copolymer of ethylene oxide and propylene oxide, a block copolymer of ethylene oxide and propylene oxide, a monoalkyl ether of the foregoing, a dialkyl ether of the foregoing, or a combination comprising at least one of the foregoing.

7. The composition of claim 1, wherein the poly(alkylene oxide) has a number average molecular weight of 300 to 40,000 grams per mole.

8. The composition of claim 1, wherein the poly(alkylene oxide) comprises a poly(propylene oxide) mono ($C_{1-12}$ alkyl) ether.

9. The composition of claim 1, further comprising 5 to 30 parts by weight of a copolymer of monomers comprising ethylene and a $C_{3-12}$ alpha olefin.

10. The composition of claim 9, wherein the copolymer comprising a copolymer of ethylene and 1-octene, and a maleic anhydride-grafted copolymer of ethylene and 1-octene.

11. The composition of claim 1, wherein the hydrogenated block copolymer comprises a polystyrene-poly(ethylene/butylene)-polystyrene triblock copolymer.

12. The composition of claim 1, comprising:
17 to 30 parts by weight of the poly(phenylene ether),
7 to 17 parts by weight of the hydrogenated block copolymer,
2 to 7 parts by weight of the polypropylene or the polyethylene, wherein the polyethylene comprises linear low density polyethylene,
3 to 9 parts by weight of the polybutene,
15 to 25 parts by weight of a copolymer of monomers comprising ethylene and a $C_{3-12}$ alpha olefin,
28 to 38 parts by weight of the flame retardant,
1 to 4 parts by weight of the liquid ultraviolet absorbing agent, and
1 to 4 parts by weight of the poly(alkylene oxide).

13. The composition of claim 12,
wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer;
wherein the flame retardant comprises magnesium dihydroxide;
wherein the hydrogenated hydrogenated block copolymer comprises a polystyrene-poly(ethylene/butylene)-polystyrene triblock copolymer;

wherein the liquid ultraviolet absorbing agent comprises a liquid hydroxyl phenyl benzotriazole ultraviolet absorbing agent, a liquid cyanoacrylate ultraviolet absorbing agent, or a combination comprising at least one of the foregoing;
wherein the poly(alkylene oxide) comprises a poly(propylene oxide) mono($C_{1-12}$ alkyl ether); and
wherein the copolymer of monomers comprising ethylene and a $C_{3-12}$ alpha olefin comprises a copolymer of ethylene and 1-octene, and a maleic anhydride-grafted copolymer of ethylene and 1-octene.

14. The composition of claim 1, further comprising an additive composition comprising one or more of stabilizers, mold release agents, lubricants, processing aids, drip retardants, hindered amine light stabilizers, cycloaliphatic epoxy resins, dyes, pigments, antioxidants, anti-static agents, mineral oil, metal deactivators, and combinations comprising at least one of the foregoing.

15. An insulated conductor comprising:
a conductor; and
an insulating covering disposed over the conductor;
wherein the insulating covering comprises a poly(phenylene ether) composition comprising:
15 to 45 parts by weight a poly(phenylene ether);
5 to 50 parts by weight of a hydrogenated block copolymer of an alkenyl aromatic monomer and a conjugated diene;
0 to 15 parts by weight of a polypropylene or a polyethylene;
2 to 10 parts by weight of a polybutene having a number average molecular weight of 500 to 1500 grams per mole;
10 to 45 parts by weight of a flame retardant;
0.5 to 10 parts by weight of a liquid ultraviolet absorbing agent having a melting point that is less than or equal to 25° C.; and
0.5 to 10 parts by weight of a poly(alkylene oxide);
wherein all parts by weight are based on 100 parts by weight total of flame retardants and polymers other than the poly(alkylene oxide).

16. The insulated conductor of claim 15, wherein the composition comprises
17 to 30 parts by weight of the poly(phenylene ether),
7 to 17 parts by weight of the hydrogenated block copolymer,
2 to 7 parts by weight of the polypropylene or the polyethylene, wherein the polyethylene comprises linear low density polyethylene,
3 to 9 parts by weight of the polybutene,
15 to 25 parts by weight of a copolymer of monomers comprising ethylene and a $C_{3-12}$ alpha olefin,
28 to 38 parts by weight of the flame retardant,
1 to 4 parts by weight of the liquid ultraviolet absorbing agent, and
1 to 4 parts by weight of the poly(alkylene oxide).

17. The insulated conductor of claim 16,
wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer;
wherein the flame retardant comprises magnesium dihydroxide;

wherein the hydrogenated hydrogenated block copolymer comprises a polystyrene-poly(ethylene/butylene)-polystyrene triblock copolymer;

wherein the liquid ultraviolet absorbing agent comprises a liquid hydroxyl phenyl benzotriazole ultraviolet absorbing agent, a liquid cyanoacrylate ultraviolet absorbing agent, or a combination comprising at least one of the foregoing;

wherein the poly(alkylene oxide) comprises a poly(propylene oxide) mono($C_{1-12}$ alkyl ether); and wherein the copolymer of monomers comprising ethylene and a $C_{3-12}$ alpha olefin comprises a copolymer of ethylene and 1-octene, and a maleic anhydride-grafted copolymer of ethylene and 1-octene.

18. A jacketed cable, comprising:

a conductor;

an insulating covering surrounding the conductor; and a jacket surrounding the insulating covering;

wherein the jacket comprises a composition comprising
15 to 45 parts by weight a poly(phenylene ether);
5 to 50 parts by weight of a hydrogenated block copolymer of an alkenyl aromatic monomer and a conjugated diene;
0 to 15 parts by weight of a polypropylene or a polyethylene;
2 to 10 parts by weight of a polybutene having a number average molecular weight of 500 to 1500 grams per mole;
10 to 45 parts by weight of a flame retardant;
0.5 to 10 parts by weight of a liquid ultraviolet absorbing agent having a melting point that is less than or equal to 25° C.; and
0.5 to 10 parts by weight of a poly(alkylene oxide);
wherein all parts by weight are based on 100 parts by weight total of flame retardants and polymers other than the poly(alkylene oxide).

19. The jacketed cable of claim 18, wherein the composition comprises
17 to 30 parts by weight of the poly(phenylene ether),
7 to 17 parts by weight of the hydrogenated block copolymer,
2 to 7 parts by weight of the polypropylene or the polyethylene, wherein the polyethylene comprises linear low density polyethylene,
3 to 9 parts by weight of the polybutene,
15 to 25 parts by weight of a copolymer of monomers comprising ethylene and a $C_{3-12}$ alpha olefin,
28 to 38 parts by weight of the flame retardant,
1 to 4 parts by weight of the liquid ultraviolet absorbing agent, and
1 to 4 parts by weight of the poly(alkylene oxide).

20. The jacketed cable of claim 19, wherein the poly(phenylene ether) is a poly(phenylene ether) having an intrinsic viscosity of 0.35 to 0.5 deciliter per gram and comprises poly(phenylene ether) homopolymer and poly(phenylene ether)-polysiloxane block copolymer;

wherein the flame retardant comprises magnesium dihydroxide;

wherein the hydrogenated hydrogenated block copolymer comprises a polystyrene-poly(ethylene/butylene)-polystyrene triblock copolymer;

wherein the liquid ultraviolet absorbing agent comprises a liquid hydroxyl phenyl benzotriazole ultraviolet absorbing agent, a liquid cyanoacrylate ultraviolet absorbing agent, or a combination comprising at least one of the foregoing;

wherein the poly(alkylene oxide) comprises a poly(propylene oxide) mono($C_{1-12}$ alkyl ether); and wherein the copolymer of monomers comprising ethylene and a $C_{3-12}$ alpha olefin comprises a copolymer of ethylene and 1-octene, and a maleic anhydride-grafted copolymer of ethylene and 1-octene.

* * * * *